US009758190B2

(12) United States Patent
Ohba et al.

(10) Patent No.: US 9,758,190 B2
(45) Date of Patent: Sep. 12, 2017

(54) VEHICLE

(71) Applicant: NTN CORPORATION, Osaka (JP)

(72) Inventors: Hirokazu Ohba, Shizuoka (JP); Yuya Yamaguchi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/034,987

(22) PCT Filed: Nov. 18, 2014

(86) PCT No.: PCT/JP2014/080482
§ 371 (c)(1),
(2) Date: May 6, 2016

(87) PCT Pub. No.: WO2015/076253
PCT Pub. Date: May 28, 2015

(65) Prior Publication Data
US 2016/0288828 A1  Oct. 6, 2016

(30) Foreign Application Priority Data

Nov. 20, 2013  (JP) .................................. 2013-239429

(51) Int. Cl.
*B62D 7/14*  (2006.01)
*B62D 3/12*  (2006.01)
(Continued)

(52) U.S. Cl.
CPC ................ *B62D 7/14* (2013.01); *B60L 1/003* (2013.01); *B60L 15/2054* (2013.01); *B62D 3/12* (2013.01);
(Continued)

(58) Field of Classification Search
CPC . B62D 7/14; B62D 7/159; B62D 3/12; B62D 7/09; B62D 7/1509; B60L 15/2054;
(Continued)

(56) References Cited

U.S. PATENT DOCUMENTS 3,279,813 A   10/1966   Linsay
5,097,917 A    3/1992   Serizawa et al.
(Continued)

FOREIGN PATENT DOCUMENTS

DE   10 2013 205 682   10/2013
JP        62-172608   11/1987
(Continued)

OTHER PUBLICATIONS

Extended European Search Report issued Oct. 25, 2016 in corresponding European Application No. 14864312.5.
(Continued)

*Primary Examiner* — Darlene P Condra
(74) *Attorney, Agent, or Firm* — Wenderoth, Lind & Ponack, L.L.P.

(57) ABSTRACT

It is desired to reduce the manufacturing cost of a vehicle while ensuring stability of travel of the vehicle. The vehicle includes a steering force generating means, and a steering device (10, 20) for steering right and left wheels (w). The steering device (10, 20) includes tie rods (12 and 22) connected, respectively, to the right and left wheels (w), and configured to steer the respective right and left wheels, a pair of rack bars (53 and 54) connected to the respective tie rods (12 and 22), and a rack bar moving means (60) capable of moving, by a same distance, the pair of rack bars (53 and 54) in one of opposite directions or in one and the other of the opposite directions, respectively, whereby the pair of rack bars (53 and 54) are moved simultaneously with each other under the steering force generated by the steering force generating means.

8 Claims, 10 Drawing Sheets

(51) Int. Cl.
  *B62D 7/09* (2006.01)
  *B62D 7/15* (2006.01)
  *B60L 1/00* (2006.01)
  *B60L 15/20* (2006.01)

(52) U.S. Cl.
  CPC ............. B62D 7/09 (2013.01); B62D 7/1509 (2013.01); B62D 7/159 (2013.01); *B60L 2220/44* (2013.01); *B60L 2240/12* (2013.01); *B60L 2240/24* (2013.01); *B60L 2240/421* (2013.01); *B60L 2240/423* (2013.01); *B60Y 2400/84* (2013.01); *Y02T 10/645* (2013.01); *Y02T 10/72* (2013.01); *Y02T 10/7275* (2013.01)

(58) Field of Classification Search
  CPC .. B60L 1/003; B60L 2240/12; B60L 2240/24; B60L 2240/421; B60Y 2400/84; Y02T 10/72; Y02T 10/7275; Y02T 10/645
  See application file for complete search history.

(56) References Cited

U.S. PATENT DOCUMENTS

| | | | |
|---|---|---|---|
| 5,381,705 | A | 1/1995 | Takahashi |
| 2005/0072621 | A1* | 4/2005 | Hara ................... B62D 1/163 180/444 |
| 2010/0106375 | A1 | 4/2010 | Ahmed et al. |
| 2010/0175491 | A1* | 7/2010 | Fujimoto ................. B62D 3/12 74/422 |
| 2013/0255531 | A1 | 10/2013 | Culver |
| 2015/0075899 | A1* | 3/2015 | Kikuchi ............... B62D 5/0409 180/444 |

FOREIGN PATENT DOCUMENTS

| | | |
|---|---|---|
| JP | 63-173766 | 7/1988 |
| JP | 63-301185 | 12/1988 |
| JP | 1-172071 | 7/1989 |
| JP | 3-112724 | 5/1991 |
| JP | 4-71963 | 3/1992 |
| JP | 2600374 | 10/1999 |
| JP | 2007-210374 | 8/2007 |
| JP | 4635754 | 12/2010 |
| JP | 2012-17093 | 1/2012 |
| JP | 5157305 | 12/2012 |
| WO | 2013/054357 | 4/2013 |

OTHER PUBLICATIONS

International Search Report issued Feb. 24, 2015 in corresponding International Application No. PCT/JP2014/080482 (with English translation).

Written Opinion of the International Searching Authority issued Feb. 24, 2015 in corresponding International Application No. PCT/JP2014/080482 (with English translation).

* cited by examiner

VEHICLE

TECHNICAL FIELD

This invention relates to a vehicle including a steering device for steering front vehicle wheels or rear vehicle wheels, and particularly such steering devices constituting a four-wheel steering mechanism.

BACKGROUND ART

A steering mechanism known as an Ackerman-Jeantaud steering mechanism includes a steering link mechanism connecting together right and left vehicle wheels (an assembly including a tire, a rim, a hub, an in-wheel motor, etc.), and is hereinafter referred to as "vehicle wheel" or simply "wheel", and used to steer the vehicle wheels. This steering mechanism includes tie rods and knuckle arms such that while the vehicle is turning, the right and left wheels move around the same center point.

Such a steering mechanism is disclosed in the below-identified Patent document 1. This steering mechanism includes steering shafts disposed between the font right and front left wheels, and between the rear right and rear left wheels, respectively, and each including right and left divided portions. A switching means is disposed between the right and left divided portions of each steering shaft, and is capable of switching the rotating direction of the steering shaft from one to the opposite direction, whereby the vehicle can move laterally with the steering angles at 90 degrees. The below-identified Patent document 2 discloses a four-wheel steering vehicle of which an actuator is actuated when the front wheels are steered such that the rear wheels are steered by the actuator.

Figure 12:
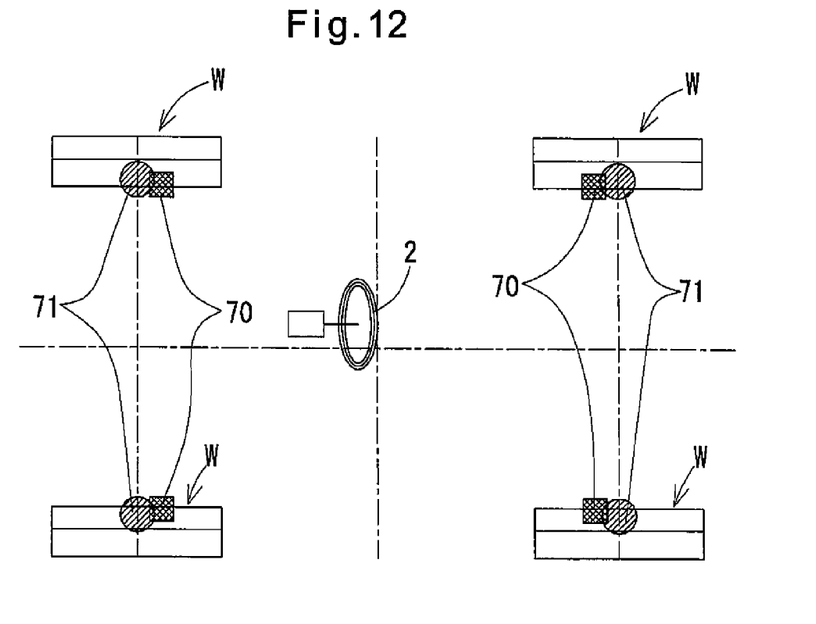
FIG. 12 is a schematic plan view of a conventional vehicle.

The below-identified Patent documents 3 and 4 each discloses a structure of which each wheel includes a steering actuator (steering mechanism) so that each wheel is steerable to a predetermined angle independently of the other wheels (see numeral 70 (steering actuator) and numeral 71 (steering mechanism), in FIG. 12). Since the wheels are steerable independently of each other, special travel modes such as pivot turning are possible.

PRIOR ART DOCUMENTS

Patent Documents

Patent document 1: JP Patent 4635754
Patent document 2: JP Utility Model Registration 2600374
Patent document 3: JP Patent Publication 2012-017093A
Patent document 4: JP Patent 5157305
N An ordinary Ackerman-Jeantaud steering mechanism allows smooth normal travel because, during normal traveling, the lines perpendicular, in plan view, to the lines of rotation of the respective wheels (widthwise center lines of the wheels) converge on the center of turning of the vehicle. However, even if it is desired to move the vehicle laterally (parallel movement in the lateral direction with respect to the fore-and-aft direction of the vehicle), it is difficult to steer the wheels in the direction perpendicular to the fore-and-aft direction of the vehicle due to the lengths of the steering links and interference with other members. Also, even if one of the right and left wheels is steered by 90 degrees, the one and the other of the right and left wheels never becomes completely parallel to each other, thus making smooth travel difficult.

In the arrangement of Patent document 2, the rotation of the steering wheel is converted to the rotation of the steering shaft extending toward the tires, and then the power is transmitted to steer the tires using non-circular wheel traveling gears and gear pairs with intersecting shafts so as to establish the Ackerman-Jeantaud steering arrangement. Since a plurality of gears are used in this arrangement to steer each tire, this arrangement is complicated in structure. Moreover, due to backlash between the gears, smooth steering of the wheels may become difficult. Also, since it is difficult to manufacture non-circular gears with high accuracy, and because of the complexity of its structure resulting from the use of electromagnets in the rotation switching mechanisms used during a pivot turn mode and a lateral travel mode, such gears and rotation switching mechanisms are inevitably costly.

Figure 13:
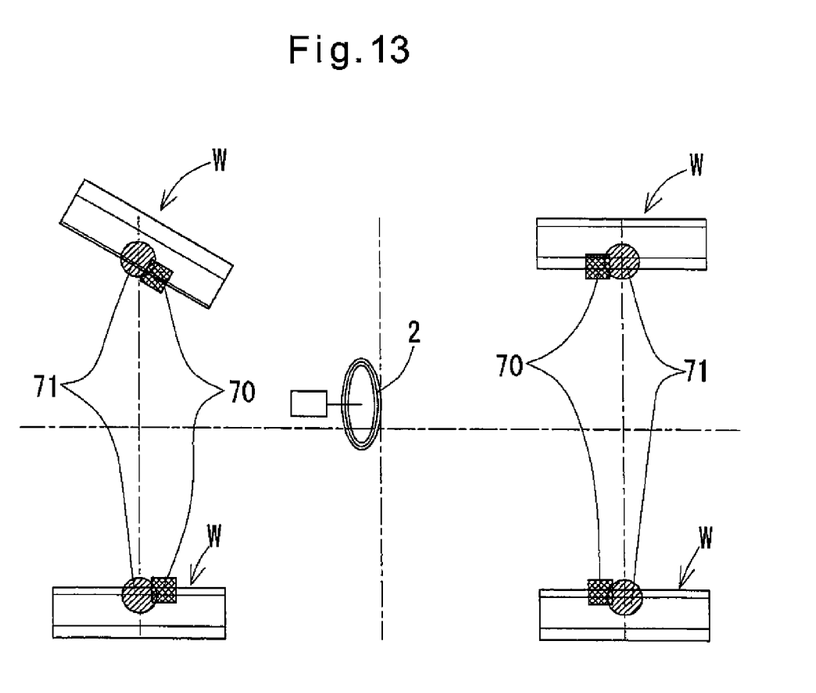
FIG. 13 shows the vehicle shown in FIG. 12, in which the front right wheel is steered due to malfunction.

The arrangement disclosed in each of Patent documents 3 and 4 is advantageous in that since the wheels are steerable independently of each other, the travel mode can be easily switched among a lateral travel mode, a pivot turn mode, etc. However, malfunction of this steering mechanism will pose a problem. For example, if, as shown in FIG. 13, only the front right wheel is steered rightwardly due to malfunction of the steering mechanism in spite of the fact that the steering 2 is not operated, since the front right wheel tends to steer the vehicle to the right, while the other three wheels tend to move the vehicle in a straight line, the vehicle cannot travel in a stable manner. This is a malfunction of the steering mechanism while the vehicle is traveling in a straight line. Any malfunction during a special travel mode such as the lateral travel mode or the pivot turn mode will also cause a similar problem.

An object of the present invention is to reduce the manufacturing cost of a vehicle while ensuring stability of travel of the vehicle.

SUMMARY OF THE INVENTION

In order to achieve the above-noted object, the present invention provides a vehicle comprising:

a steering force generating means capable of generating a steering force; and at least one steering device for steering right and left wheels which are constituted by a pair of front wheels of the vehicle or a pair of rear wheels of the vehicle.

The steering device comprises:

tie rods connected, respectively, to the right and left wheels, and configured to steer the respective right and left wheels;

a pair of rack bars connected to the respective tie rods; and a rack bar moving means capable of moving, by the same distance, the pair of rack bars in one of opposite directions or in one and the other of the opposite directions, respectively.

The steering force generating means and the steering device are configured such that the pair of rack bars are moved simultaneously with each other under the steering force generated by the steering force generating means.

By moving the pair of rack bars simultaneously with each other by means of the steering force generating means, either of the right and left wheels will never be steered alone. This prevents the right and left wheels from being steered in contradictory manners as shown in FIG. 13, whereby the vehicle becomes unable to travel in a stable manner. Also, since the right and left wheels are steered by a single steering force generating means and a single steering device, compared to the arrangement in which steering actuators are provided in the respective wheels, as disclosed in Patent documents 3 and 4, the cost of component parts is low.

In this arrangement, the steering force generated by the steering force generating means is preferably one of a torque generated when a steering of the vehicle is turned by a driver of the vehicle, and a torque generated by a steering actuator configured to be actuated when the steering is turned by the driver.

In either of the above arrangements, the rack bar moving means preferably comprises:

a synchronizing gear meshing with the pair of rack bars, and configured to convert the movement of one of the rack bars in one of the opposite directions, which are right and left directions, along the direction in which teeth of the rack bars are arranged, to the movement of the other of the rack bars in the other of the opposite directions;

a first pinion gear meshing with the one of the rack bars;

a second pinion gear meshing with the other of the rack bars; and a coupling mechanism configured to selectively couple together the first pinion gear and the second pinion gear, and uncouple the first pinion gear and the second pinion gear from each other.

During a normal travel mode, the pair of rack bars are fixed together by coupling the coupling mechanism, so that it is possible to steer the right and left wheels in the same direction in the same manner as conventional steering operation. During a special travel mode, such as the lateral travel mode or the pivot turn mode, the rack bars are moved in the opposite directions to each other by uncoupling the coupling mechanism, so that it is possible to steer the right and left wheels in the opposite directions to each other. Thus, by using the coupling mechanism which can be selectively coupled and uncoupled in a vehicle of which all the four wheels are steerable, the front and rear wheels can be steered in the same direction or in the opposite directions, so that e.g. a lateral travel mode becomes possible.

In any of the above arrangements, two of the steering devices are provided for the pair of front wheels and the pair of rear wheels, respectively. With this arrangement, since the steering properties of the front wheels and the rear wheels are similar to each other, the steering stability improves. Also, since common parts are used for the front wheels and the rear wheels, it is possible to reduce the manufacturing cost of the vehicle.

Advantages of the Invention

The vehicle according to the present invention comprises a steering force generating means capable of generating a steering force, and at least one steering device for steering right and left wheels which are constituted by a pair of front wheels of the vehicle or a pair of rear wheels of the vehicle, wherein the steering device comprises tie rods connected, respectively, to the right and left wheels, and configured to steer the respective right and left wheels, a pair of rack bars connected to the respective tie rods, and a rack bar moving means capable of moving, by the same distance, the pair of rack bars in one of opposite directions or in one and the other of the opposite directions, respectively, wherein the steering force generating means and the steering device are configured such that the pair of rack bars are moved simultaneously with each other under the steering force generated by the steering force generating means. With this arrangement, since the right and left wheels are always steered simultaneously, it is possible to prevent e.g. only one of the four wheels from being steered due to malfunction, thus maintaining travel stability of the vehicle.

DETAILED DESCRIPTION OF THE INVENTION

An embodiment of the present invention is described. In the embodiment, two steering devices according the present invention are used for a vehicle 1 including in-wheel motors M mounted in the rims of all of the front right, front left, rear right and rear left wheels w. The in-wheel motors M allow various travel patterns.

Figure 1:
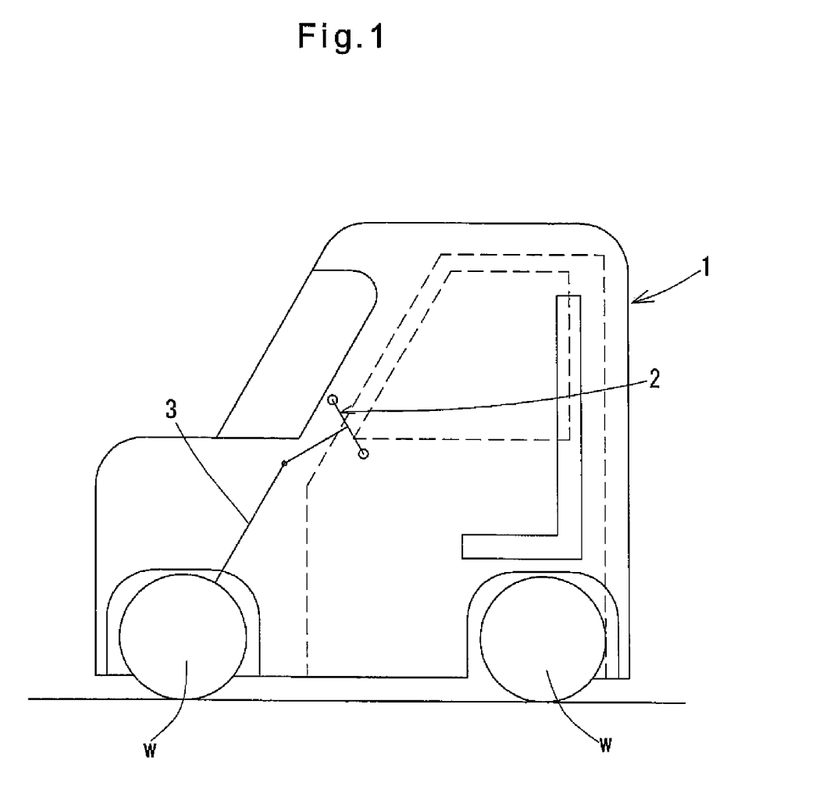
FIG. 1 shows a vehicle according to the present invention.

FIG. 1 shows the vehicle 1, in which the steering devices of the embodiment are used. This vehicle is an ultra-small (laterally arranged) two-seater mobility vehicle. The vehicle 1 is configured such that by operating a steering wheel 2, the wheels w can be steered through a steering shaft 3. The present invention is not only applicable to such an ultra-small mobility vehicle but also to an ordinary vehicle.

FIGS. 2(a) and 2(b) are schematic plan views of the vehicle 1 of the embodiment showing its drive line. One of the steering devices, i.e. the first steering device 10 is coupled to the front right wheel FR and the front left wheel FL through tie rods 12, while the second steering device 20 is coupled to the rear right wheel RR and the rear left wheel RL through tie rods 22.

Figure 2:
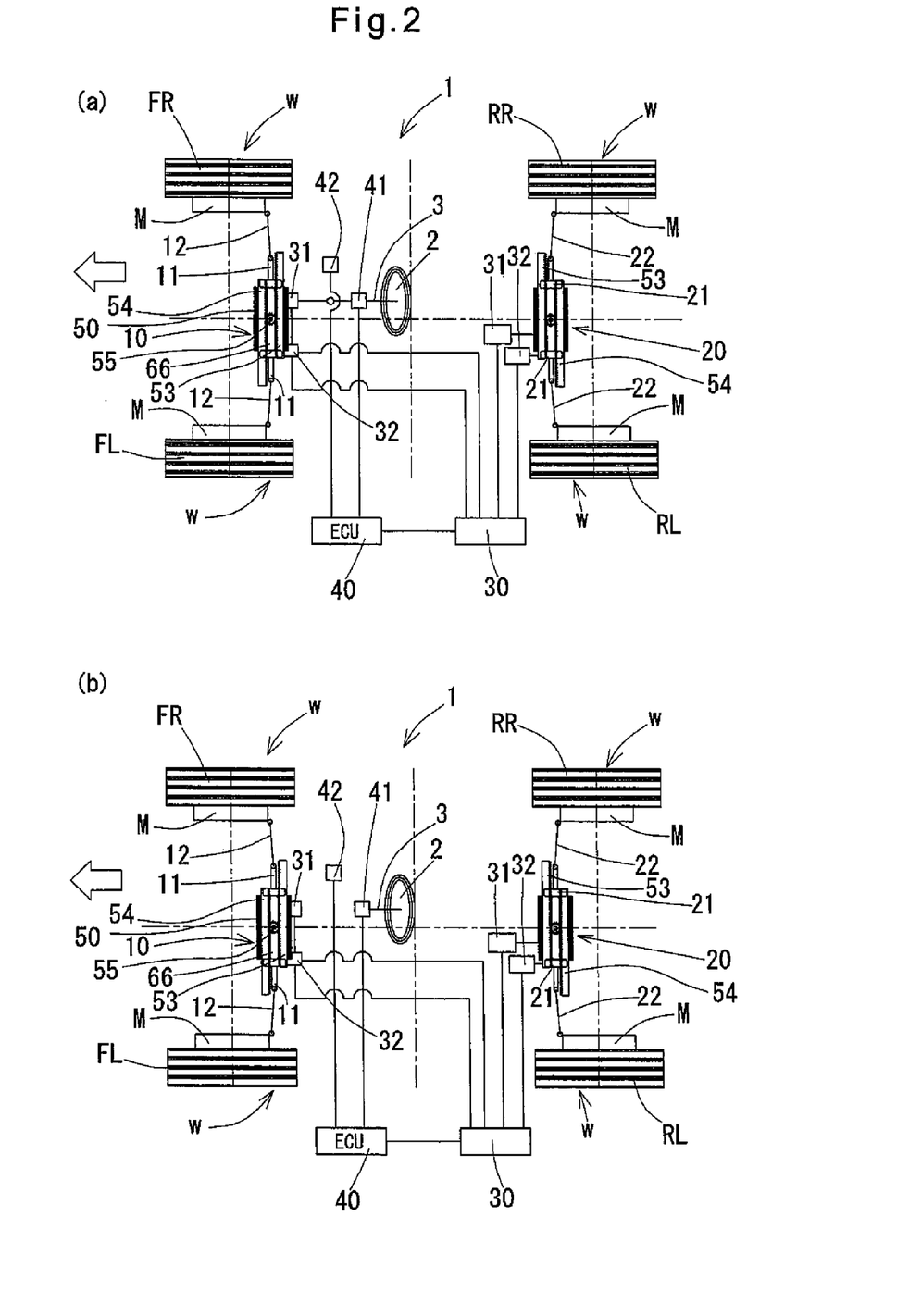
FIGS. 2(a) and 2(b) are plan views of a vehicle of which only the rear wheels are steered by the steer-by-wire arrangement, and a vehicle of which both the front and rear wheels are steered by the steer-by-wire arrangement, and both including steering devices of the embodiment.

The first steering device 10 for the front wheels according to the present invention allows normal steering by rotating a pinion shaft 61 (see FIG. 10) about its axis under a steering force generated by a steering force generating means. The steering force generated by the steering force generating means is in the form of torque generated when the steering wheel 2 is turned by a driver (if the front wheels are steered in an ordinary manner as shown in FIG. 2(*a*)), or in the form of torque generated by a steering actuator 31 actuated when the steering wheel 2 is turned (if the front wheels are steered by the steer-by-wire arrangement as shown in FIG. 2(*b*)). By transmitting either of these torques to the pinion shaft 61, and moving two rack bars simultaneously, the right and left front wheels w can be steered simultaneously.

The second steering device 20 for the rear wheels according to the present invention allows normal steering by rotating a pinion shaft 61 (see FIG. 10) of the second steering device 20 about its axis under torque generated by a steering actuator 31 of the second steering device 20 actuated when the steering wheel 2 is turned (steer-by-wire arrangement shown both in FIGS. 2(*a*) and 2(*b*) for the rear wheels). By transmitting either of these torques to the pinion shaft 61, and moving two rack bars of the second steering device 20 simultaneously, the right and left rear wheels w can be steered simultaneously. FIGS. 2(*a*) and 2(*b*) show details of the vehicle 1 shown in FIG. 1, on which is mounted the four-wheel steering mechanism constituted by the first and second steering devices 10 and 20 for the front and rear wheels, respectively. The steering devices 10 and 20 for the front and rear wheels are basically identical in structure. One of the steering devices 10 and 20 may be omitted. If the steering device 10 is omitted, an ordinary steering device may be connected to the front wheels instead.

All of the figures of the present application show the arrangement in which an in-wheel motor M is mounted in every one of the wheels w, but in-wheel motors M may be mounted only in the front two wheels or only in the rear two wheels.

Of the two rack bars for steering the right and left wheels w, of each of the steering devices 10 and 20 for the front wheels and the rear wheels, the rack bar connected to the left wheel w, with respect to the fore-and-aft direction of the vehicle, is referred to as a first rack bar 53, and the rack bar connected to the right wheel w is referred to as a second rack bar 54. In each of FIGS. 2(*a*) to 6, the arrow on its left-hand side indicates the forward direction of the vehicle. As shown, e.g., in FIG. 10, synchronizing gears 55 are provided between the two rack bars 53 and 54 so as to each mesh with both of the rack bars 53 and 54. As shown e.g. in FIGS. 11(*a*) and 11(*b*), the synchronizing gears 55 are retained in a synchronizing gear box 66.

For each of the steering devices 10 and 20, as shown in FIGS. 2(*a*) and 2(*b*), the first and second rack bars 53 and 54 are connected to the right and left wheels w by connecting members 11, 21 hingedly connected to the wheels through the tie rods 12, 22. Knuckle arms or other members are disposed between the tie rods 12 and 22 and the respective wheels w.

Figure 7:
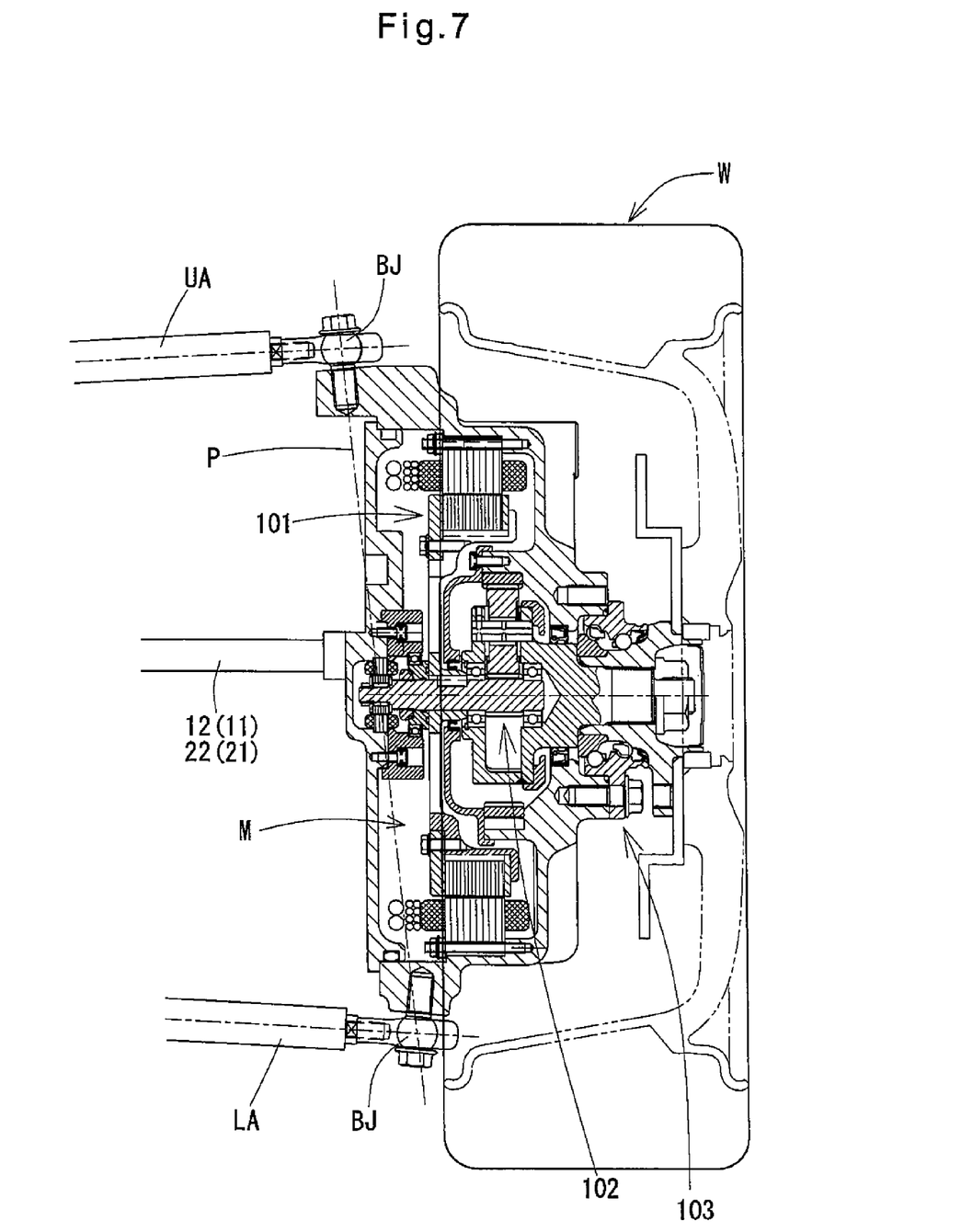
FIG. 7 is a sectional view of a wheel, showing how the wheel is supported.

FIG. 7 shows how each tie rod 12, 22 is connected to the corresponding wheel w, in which is mounted the in-wheel motor M. Any of the wheels w is steerable about a kingpin axis P connecting together the center lines of ball joints BJ provided, respectively, at the distal ends of an upper arm UA and a lower arm LA supported by the vehicle frame. The in-wheel motor M includes a motor main body 101, a speed reducer 102 and a wheel bearing 103 which are arranged in series in this order from the inboard to outboard side of the vehicle.

Figure 8:
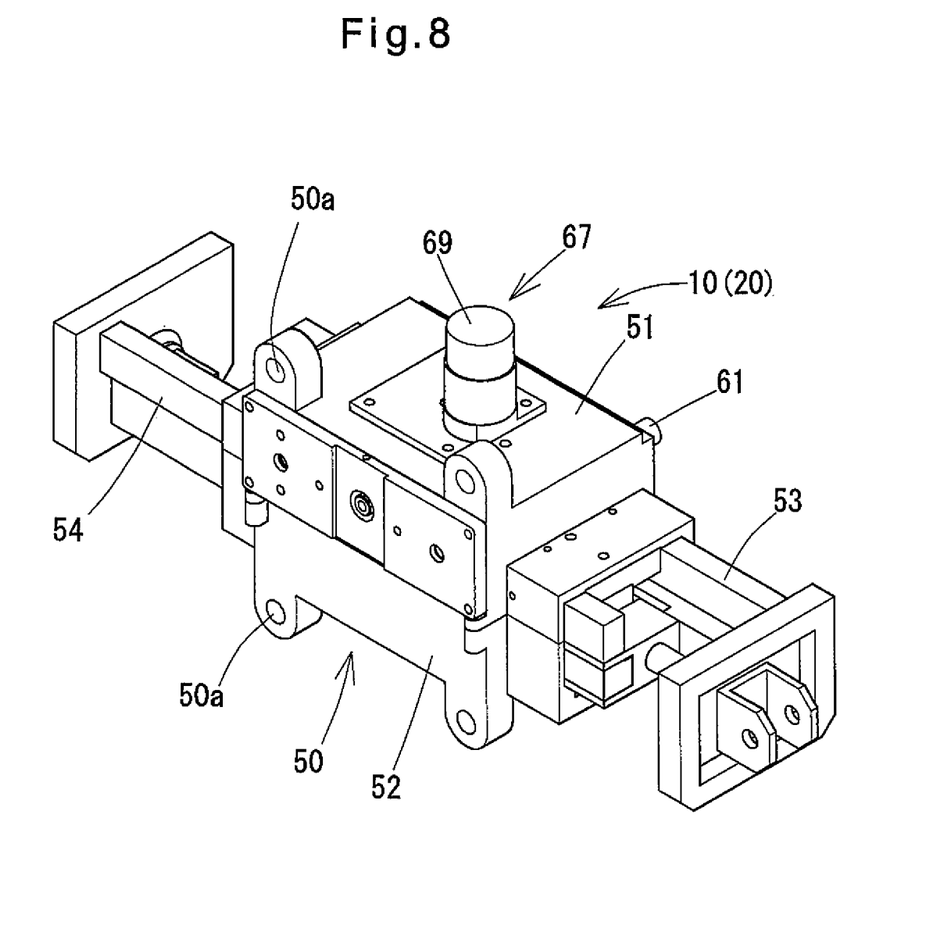
FIG. 8 is a perspective view of a steering device, showing its outer appearance.

For each of the steering devices 10 and 20, as shown in FIG. 8, the first and second rack bars 53 and 54 are mounted in a rack case (steering cylinder) 50 extending in the right-and-left direction of the vehicle relative to the direction in which the vehicle moves in a straight line (fore-and-aft direction of the vehicle). The rack case 50 is supported by the frame (chassis), not shown, of the vehicle 1.

The rack case 50 may be supported by the vehicle 1 by directly or indirectly fixing flanges 50*a* of the rack case 50 to the frame of the vehicle 1 by screws or bolts.

The first rack bar 53 and the second rack bar 54 are movable simultaneously with, and by the same distance as, each other in the rack case 50, in one of the right and left directions of the vehicle relative to the direction in which the vehicle moves in a straight line. The normal steering actuator 31 causes this movement based on the operation of the steering wheel 2 by the driver. This movement causes the corresponding right and left wheels to be steered simultaneously in the right direction or in the left direction.

Figure 9:
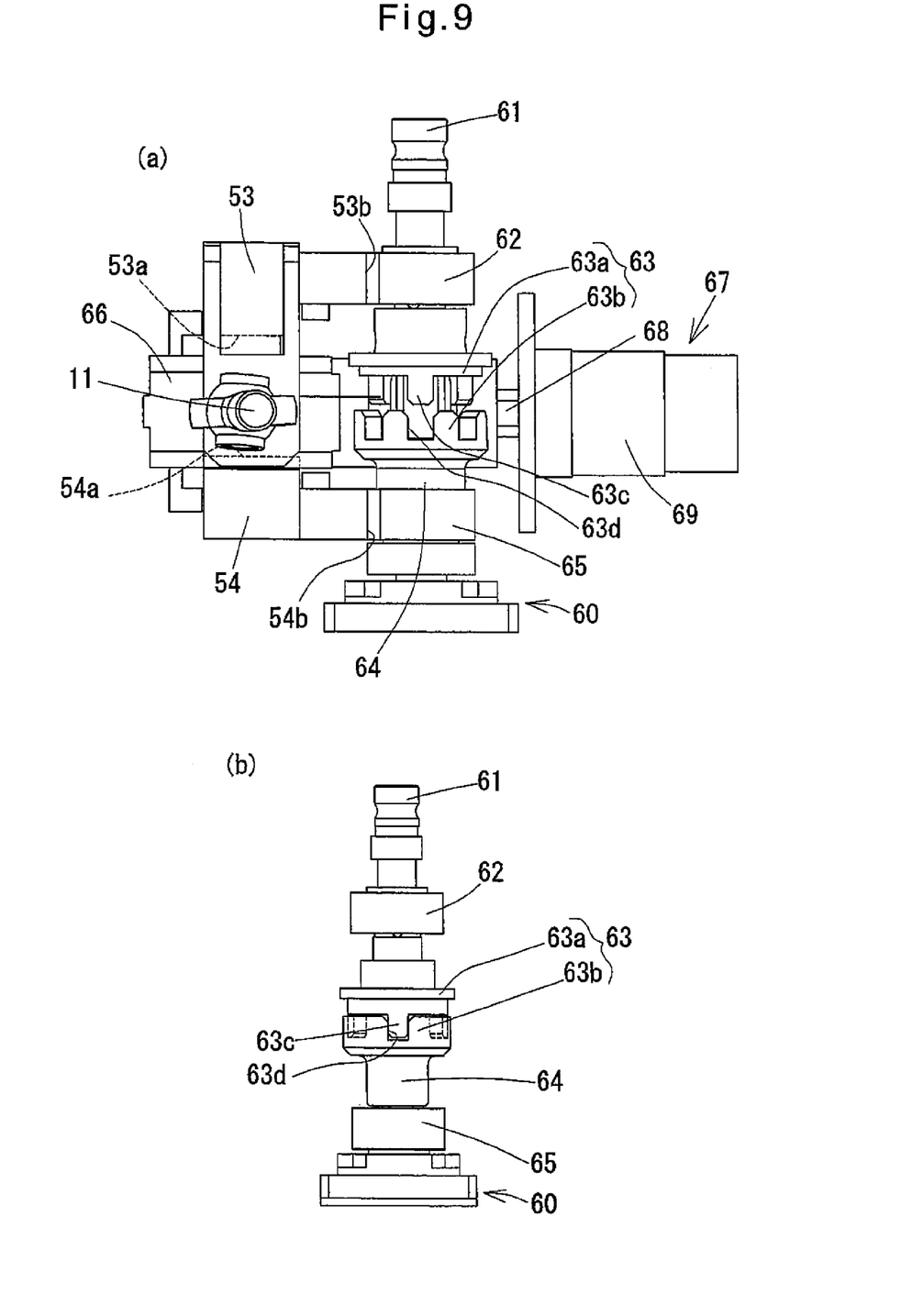
FIGS. 9(a) and 9(b) are front views of the steering device, showing the detailed structure of its rack bar moving means, and showing uncoupled and coupled states, respectively.
Figure 11:
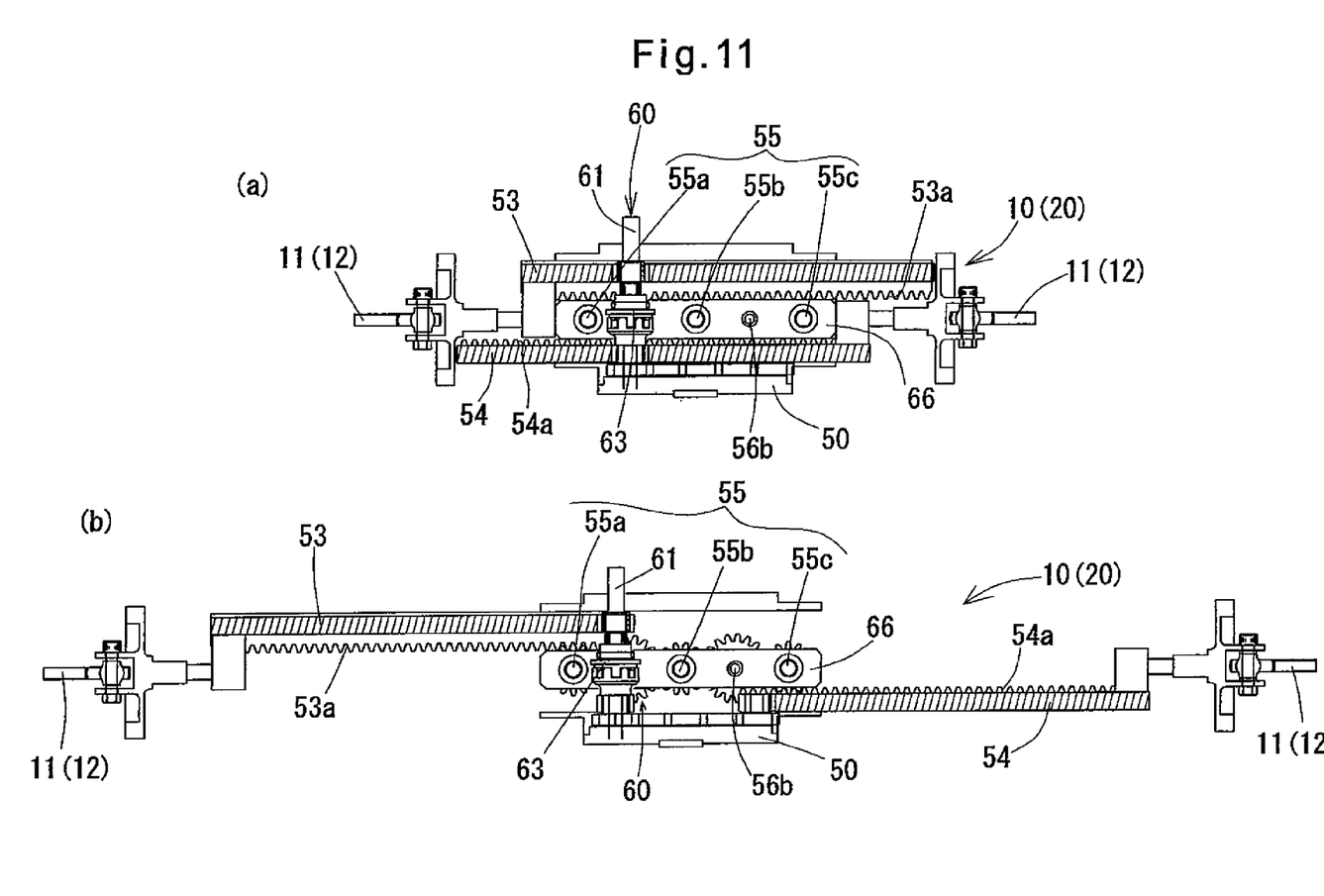
FIGS. 11(a) and 11(b) are plan views of the steering device, showing, respectively, the state in which a pair of rack bars are close to each other, and the state in which the rack bars are opened.

As shown in FIGS. 9 and 11, each steering device 10, 20 further includes a fixing mechanism 67 through which the synchronizing gear box 66 is fixed to the rack case 50. The fixing mechanism 67 has a built-in fixing actuator 69. By actuating the fixing actuator 69, a presser (not shown) is pressed against the synchronizing gear box 66, so that it is possible to fix the synchronizing gear box 66 to the rack case 50, which is fixed to the frame. By fixing the synchronizing gear box 66 in this manner, the right and left wheels can be steered by the same angle not only while the vehicle is moving in a straight line but when the steering wheel 2 is turned by any angle.

The pinion shaft 61, shown in FIGS. 9(*a*) and 9(*b*), is connected to a steering shaft 3 (if the corresponding wheels are steered in an ordinary manner; see the front wheels of the vehicle of FIG. 2(*a*)), or to the actuator 31, such as a motor, actuated when the steering wheel 2 is tuned (if the corresponding wheels are steered by the steer-by-wire arrangement; see FIG. 2(*b*) and the rear wheels of FIG. 2(*a*)). A first pinion gear 62 is integral with the pinion shaft 61, or joined to, so as to be rotatable together with, the pinion shaft 61, and meshes with the first rack bar 53. The steering device further includes a second pinion gear 65 meshing with the second rack bar 54. The first and second rack bars 53 and 54 extend parallel to each other.

As shown in FIG. 11, the steering device further includes a coupling mechanism 63 capable of rotationally coupling and uncoupling the first and second pinion gears 62 and 65. FIG. 9(*a*) shows the state in which the first and second pinion gears 62 and 65 are uncoupled from each other, while FIG. 9(*b*) shows the state in which they are coupled together.

Figure 10:
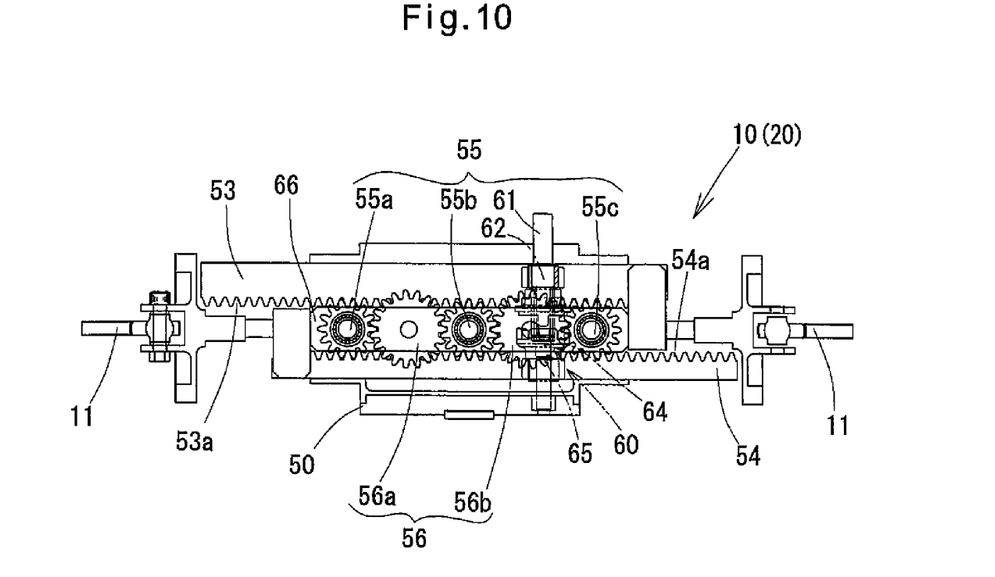
FIG. 10 is a front view of the steering device, showing its interior.

As shown in FIG. 10, each of the steering devices 10 and 20 includes a rack bar moving arrangement 60. The rack bar moving arrangement 60 is capable of simultaneously moving the first and second rack bars 53 and 54, respectively, in one and the other of the right and left directions (i.e., opposite directions) relative to the direction in which the vehicle moves in a straight line (i.e. the opposite directions in which the rack teeth are arranged) by the same distance.

The rack bar moving arrangement 60 includes the first synchronizing gears 55. As shown in FIG. 10, each synchronizing gear 55 meshes with both a synchronizing rack gear 53*a* of the first rack bars 53 and a synchronizing rack gear 54*a* of the second rack bar 54, which faces the synchronizing rack gear 53*a*.

The first synchronizing gears 55 comprise three gears 55*a*, 55*b* and 55*c* that are arranged in the direction in which the rack teeth of the rack gears of the rack bars 53 and 54 and spaced apart from each other at regular intervals. When, with the first and second pinion gears 62 and 65 uncoupled from each other by the coupling mechanism 63 shown in FIGS. 9(*a*) and 9(*b*), the first rack bar 53 is moved in one of the opposite directions in which the rack teeth are arranged under a driving force applied from the rack bar moving arrangement 60, this movement is converted to the movement of the second rack bar 54 in the other of the opposite directions.

As shown in FIGS. 10, 11(a) and 11(b), the rack bar moving arrangement 60 further includes second synchronizing gears 56 comprising gears 56a and 56b which are disposed between the adjacent first synchronizing gears 55, i.e. between the gears 55a and 55b and between the gears 55b and 55c, respectively. The second synchronizing gears 56 are in mesh with neither of the synchronizing rack gear 53a of the first rack bar 53 and the synchronizing rack gear 54a of the second rack bar 54, and are in mesh with only the first synchronizing gears 55. The second synchronizing gears 56 serve to rotate the three first synchronizing gears 55a, 55b and 55c by the same angle in one (the same) circumferential direction. The second synchronizing gears 56 ensure smooth relative movement between the first rack bar 53 and the second rack bar 54.

As shown in FIGS. 9(a) and 9(b), the first and second rack bars 53 and 54 include, besides the synchronizing rack gears 53a and 54a, steering rack gears 53b and 54b, respectively.

The synchronizing rack gear 53a, 54a and the steering rack gear 53b, 54b, of each of the first and second rack bars 53 and 54 may be separate members from each other that are fixed together by means of e.g. bolts.

Through the steering rack gears 53b and 54b, driving forces for moving the respective rack bars 53 and 54 in one of the opposite directions in which the rack teeth are arranged are applied.

In order to move the rack bars from the position shown in FIG. 11(a) (where the vehicle can move in a straight line) to the position shown in 11(b) (where the vehicle is in the below-described lateral travel mode), with the coupling mechanism 63 uncoupled, a driving force is applied from the rack bar moving arrangement 60, thereby moving the first rack bar 53 in one of the opposite directions (i.e., laterally with respect to the forward/rear directions). When the first rack bar 53 is moved in this direction, the driving force is applied to the second rack bar 54 through the first synchronizing gears 55, which mesh with both the first rack bar 53 and the second rack bar 54, so that the second rack bar 54 is moved in the other the opposite lateral direction, simultaneously with, and by the same distance as, the first rack bar 53.

While the vehicle is traveling in a straight line (see FIG. 11(a)), the coupling mechanism 63 becomes meshed, with the tires (rack bars) in the position while the vehicle is traveling in a straight line, so that the first pinion gear 62 and the second pinion gear 65 are rotationally fixed together. When the steering shaft 3 is rotated by turning the steering wheel 2 in this state, the first rack bar 53 and the second rack bar 54 simultaneously move in one of the right and left directions (i.e., the same lateral direction) by the same distance in the rack case 50 mounted to the frame.

During the lateral travel mode (see FIG. 11(b)), the coupling mechanism 63 is uncoupled with the first rack bar 53 and the second rack bar 54 meshing with the synchronizing gears 55 in the synchronizing gear box 66. As a result, the rack bars 53 and 54 are moved by the same distance relative to the synchronizing gear box 66 in the directions opposite to each other (i.e., opposite lateral directions). By fixing the synchronizing gear box 66 to the rack case 50, which is fixed to the frame, even if surfaces with which the right and left wheels w (tires) are brought into contact are inclined or are different in frictional state from each other, it is possible to simultaneously move the pair of rack bars 53 and 54 by the same distance in the right and left directions, respectively, relative to the synchronizing gear box 66. This in turn makes it possible to move (steer) the right and left wheels w connected to the respective rack bars 53 and 54 through the tie rods 12 and 22, always by the same angle as each other.

The operation of the rack bar moving arrangement 60 is now described.

The rack bar moving arrangement 60 of the steering device 10 for the front wheels includes the pinion shaft (first rotary shaft) 61 of the steering device 10 (see FIGS. 9(a) and 9(b)). The first rotary shaft 61 is directly rotated by the steering wheel 2 when a driver turns the steering wheel 2. However, the rack bar moving arrangement 60 may be configured such that instead of the first rotary shaft 61 being directly rotated by the steering wheel 2 when the driver turns the steering wheel 2, the first rotary shaft 61 is rotated under a driving force of the normal steering actuator 31 of the first steering device 10, which is actuated when the driver turns the steering wheel 2, or under a driving force of a mode switching actuator 32 of the first steering device 10, which is actuated when a mode switching arrangement 42 mounted on the vehicle 1 is operated.

The rack bar moving arrangement 60 of the second steering device 20 for the rear wheels includes the first rotary shaft 61 of the second steering device 20. This rotary shaft 61 is configured to be rotated under a driving force of the normal steering actuator 31 of the second steering device 20, which is actuated when the driver turns the steering wheel 2, or under a driving force of a mode switching actuator 32 of the steering device 20, which is actuated when a mode switching arrangement 42 mounted on the vehicle 1 is operated. This rack bar moving arrangement 60 further includes the first pinion gear 62 of the second steering device 20, which is mounted to the first rotary shaft 61 so as to rotate together with the first rotary shaft 61. Rotation is transmitted from the actuating shaft of the normal steering actuator 31 or the mode switching actuator 32 to the first rotary shaft 61 through the steering joint (see FIGS. 9(a) and 9(b)).

Each rack bar moving arrangement 60 includes, besides the first pinion gear 62, which is integral with or fixed to the first rotary shaft 61, a second rotary shaft 64 aligned with the first rotary shaft 61, and a second pinion gear 65 mounted on the second rotary shaft 64 so as to be rotatable together with the second rotary shaft 64.

FIG. 8 is a perspective view of the entire steering device 10, 20. As shown, the first rack bar 53, the second rack bar 54, etc. are disposed between a front cover 52 and a rear cover 51. While not shown, boots are provided to extend from portions where the tie rods 12 and 22 are mounted to the rack case 50 (its front and rear portions 51 and 52) to prevent contact of foreign matter with moving parts. The first rotary shaft 61 is connected to the actuating shaft of the mode switching actuator 32 through the steering joint, not shown.

As shown in FIGS. 9(a) and 9(b), the first pinion gear 62 is in mesh with the steering rack gear 53b of the first rack bar 53, and the second pinion gear 65 is in mesh with the steering rack gear 54b of the second rack bar 54.

The rack bar moving arrangement 60 includes the coupling mechanism 63. The coupling mechanism 63 is disposed between the first pinion gear 62 and the second pinion gear 65 and configured to selectively uncouple the first and second rotary shafts 61 and 64 from each other (so that they can rotate relative to each other) and couple the shafts 61 and 64 together (so that they cannot rotate relative to each other).

As shown in FIGS. 9(a) and 9(b), the coupling mechanism 63 includes a fixed part 63b provided on the second rotary shaft 64, and a moving part 63a provided on the first rotary shaft 61. The coupling mechanism 63 is configured such that when the moving part 63a is pressed against the fixed part 63b, protrusions 63c formed on the moving part 63a are engaged in recesses 63d formed in the fixed part 63b, thereby allowing the shafts 61 and 64 to rotate together. However, conversely to the above, the protrusions 63c may be formed on the fixed part 63b, and the recesses 63d may be formed in the moving part 63a.

The coupling mechanism 63 is further configured such that the moving part 63a can be moved axially away from the fixed part 63b by an external driving source such as a push solenoid until the fixed part 63b and the moving part 63a are uncoupled from each other, and the first and second rotary shafts 61 and 64, and thus the first and second pinion gears 62 and 65, are uncoupled from each other and rotatable independently of each other, as shown in FIG. 9(a). FIG. 9(a) shows the state in which the first and second pinion gears 62 and 65 are uncoupled (disengaged) from each other. FIG. 9(b) shows the state in which the first and second pinion gears 62 and 65 are coupled together.

While the coupling mechanism 63 is uncoupled and thus the first pinion gear 62 and the second pinion gear 65 are rotatable relative to each other, since the first and second pinion gears 62 and 65 are in mesh with the first and second rack bars 53 and 54, respectively, and the first and second rack bars 53 and 54 are in mesh with each other through the first synchronizing gears 55, when the first pinion gear 62 is rotated, and the first rack bar 53 is moved in one of the opposite directions in which the rack teeth are arranged, i.e. one of the right and left directions of the vehicle, the first synchronizing gears 55 rotate, thus simultaneously moving the second rack bar 54 in the other of the right and left directions by the same distance as the first rack bar 53 is moved. At this time, the second pinion gear 65 is rotated by the second rack bar 54 independently of the first pinion gear 62.

Thus, by selectively coupling together the first and second pinion gears 62 and 65 and uncoupling them from each other by the coupling mechanism 63, it is possible to, easily, either move the rack bars 53 and 54 in one of the right and left directions together with each other, or move the rack bars 53 and 54 in the opposite directions to each other.

That is, with the first rack bar 53 and the second rack bar 54 coupled together through the first pinion gear 62 and the second pinion gear 65 by the coupling mechanism 63, when a driver turns the steering wheel 2, the first rack bar 53 and the second rack bar 54 are simultaneously moved the same distance in one of the right and left (lateral) directions with respect to the direction in which the vehicle is moved in a straight line. As a result, the corresponding right and left wheels w can be steered simultaneously about the respective kingpin axes P (see FIG. 7) in the same direction. At this time, since the first rack bar 53 and the second rack bar 54 are moved together with each other, the first synchronizing gears 55 do not rotate.

When the first pinion gear 62 and the second pinion gear 65 are uncoupled from each other, it is possible to simultaneously move the first rack bar 53 and the second rack bar 54 by the same distance in one and the other of the right and left directions, with respect to the direction in which the vehicle is moved in a straight line, thereby simultaneously steering the right and left wheels w in opposite directions to each other about the respective kingpin axes P (FIG. 7).

Thus, in this embodiment, when the steering wheel 2 is rotated by a driver, the rotation of the steering wheel 2 is transmitted to the first rotary shaft 61 through the steering shaft 3. During normal operation (while the coupling mechanism 63 is coupled), the rack bar moving arrangement means 60 serves to simultaneously move the first rack bar 53 and the second rack bar 54 in the same direction the same distance.

During mode switching, the driving force of the mode switching actuator 32 is transmitted to the respective rack bars 53 and 54 due to rotation of the respective pinion gears 62 and 65. While the driving force of the mode switching actuator 32 is being applied to the respective rack bars 53 and 54 through the pinion gear 62, the rotation of the steering shaft 3 may or may not be transmitted to the steering wheel 2.

The normal steering actuator 31 may have the function of the mode switching actuator 32, too. That is, during mode switching, the rotation of the steering shaft 3 may be transmitted to the first rotary shaft 61 through the normal steering actuator 31.

Also, the in-wheel motors M on both sides of the steering device 10, 20 may be configured and designed to serve as the mode switching actuator 32. Further, the wheels may be steered by the steering force generated by the normal steering actuator 31, the mode switching actuator 32, the right and left in-wheel motors M, or a combination of them.

Now description is made of several travel modes of the vehicle in which the steering devices 10 and 20 are mounted.

(Normal Travel Mode)

With the wheels positioned as shown in FIGS. 2(a) and 2(b), in which the vehicle is supposed to travel in a straight line, the coupling mechanism 63, shown in FIGS. 9(a) and 9(b), of the steering device 10 for the front wheels is coupled, whereby the first rack bar 53 and the second rack bar 54, which are held by the rack case 50, are movable together with each other. The pair of rack bars 53 and 54 in the rack case 50 mounted to the frame of the vehicle are thus simultaneously moved in one of the right and left directions of the vehicle 1 by the same distance.

Figure 3:
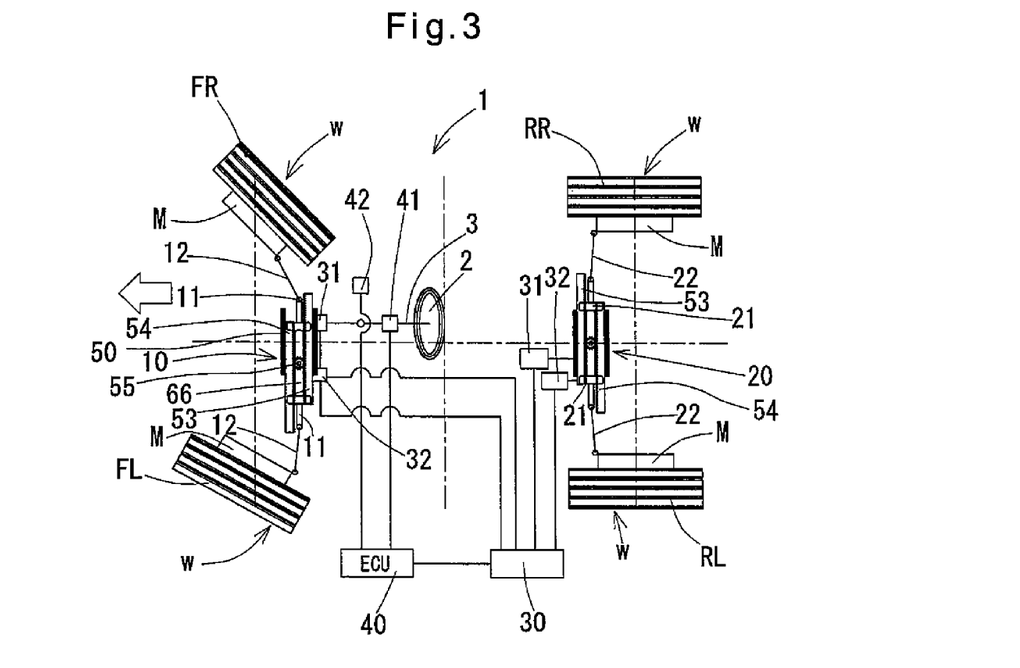
FIG. 3 is a plan view of the vehicle of FIG. 2(a) during a normal travel mode (normal steering mode).

When the first and second rack bars 53 and 54 of the steering device 10 are simultaneously moved by the same distance in one of the right and left directions with respect to the direction in which the vehicle is moved in a straight line, under the driving force of the normal steering actuator 31 or by operating the steering wheel 2, the front right and front left wheels w are simultaneously steered by a predetermined angle. FIG. 3 shows the state of the vehicle when the front wheels are steered to the right. That is, by completely fixing the rack bars 53 and 54 to each other, the vehicle 1 can travel in the same manner as ordinary vehicles. During the normal travel mode, when a driver operates the steering wheel 2, the front wheels are steered through the first steering device 10 for the front wheels such that the vehicle can travel in a straight line, turn right or left, or travel otherwise according to situations.

(Small Radius Turning Mode)

Figure 4:
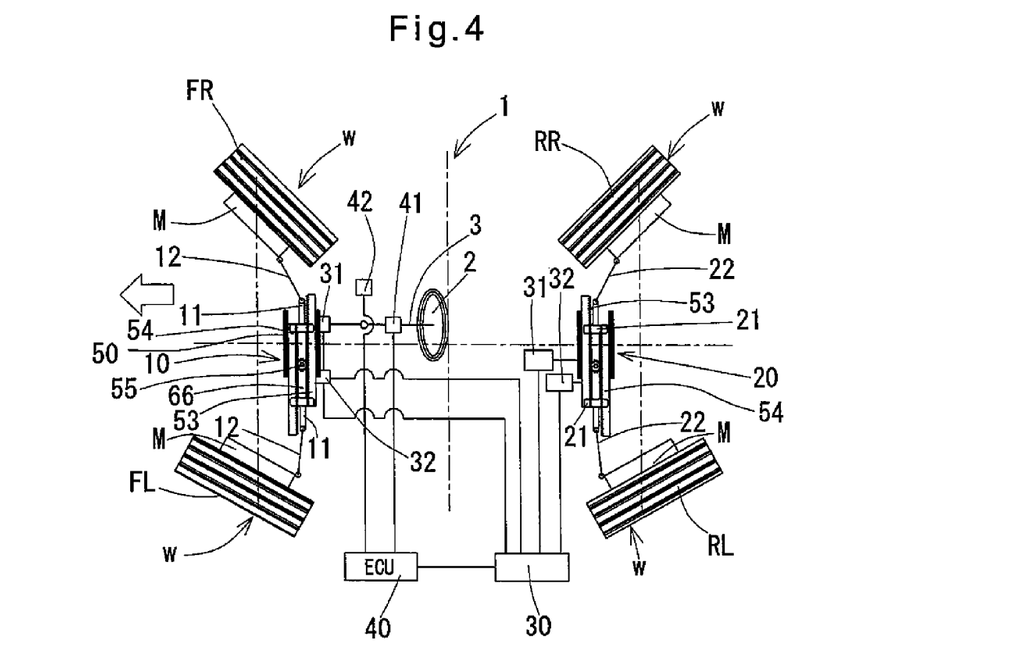
FIG. 4 is a plan view of the vehicle of FIG. 2(a) during a small-radius turning mode.

FIG. 4 shows a small radius turning mode, in which the first steering device 10 for the front wheels is moved as shown in FIG. 3, and further, the coupling mechanism 63, shown in FIGS. 9(a) and 9(b), of the second steering device 20 for the rear wheels is also coupled, whereby the first rack bar 53 and the second rack bar 54 of the steering device 20 are movable together with each other. The pair of rack bars 53 and 54 in the rack case 50 of the second steering device 20, which is fixed to the frame of the vehicle, are thus also simultaneously moved in one of the right and left directions of the vehicle 1.

When the first and second rack bars 53 and 54 of the steering device 20 are simultaneously moved by the same distance in one of the right and left directions with respect to the direction in which the vehicle is moved in a straight line under the driving force of the normal steering actuator 31, the rear right and rear left wheels w are simultaneously steered by a predetermined angle as shown in FIG. 4. At this time, the rear wheels are steered in the opposite direction to the direction in which the front wheels are steered. (In FIG. 4, the front wheels are steered to the right, while the rear wheels are steered to the left.) This allows the vehicle to be turned with a smaller radius than during the normal travel mode. In FIG. 4, the rear wheels are steered in the opposite direction to the direction in which the front wheels are steered by the same angle as the front wheels, but may be steered by a different angle from the angle by which the front wheels are steered.

(Pivot Turn Mode)

Figure 5:
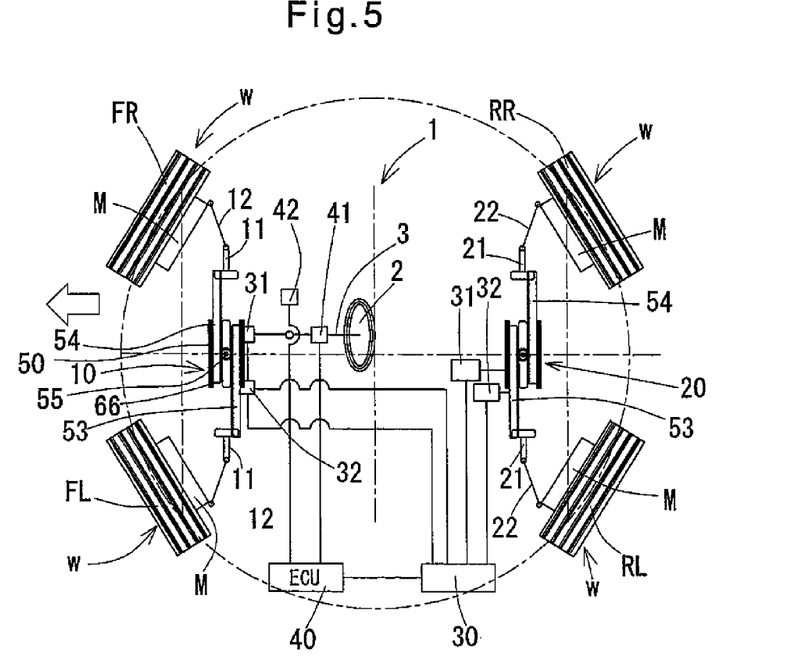
FIG. 5 is a plan view of the vehicle of FIG. 2(a) during a pivot turn mode.

A pivot turn mode is shown in FIG. 5. In this mode, for each of the steering devices 10 and 20, the synchronizing gear box 66 is fixed to the rack case 50 at the position where it is fixed while the vehicle is traveling in a straight line, by means of the fixing mechanism 67, and the coupling mechanism 63 (see FIGS. 9(*a*) and 9(*b*)) is uncoupled. Thus, the first rack bar 53 and the second rack bar 54 are movable separately from each other. Thus, when the driving force of the mode switching actuator 32 is applied to the first pinion gear 62, the first rack bar 53 and the second rack bar 54 are moved simultaneously by the same distance in opposite directions to each other by the action of the first synchronizing gears 55 disposed between the first rack bar 53 and the second rack bar 54, so that the right and left wheels w are steered simultaneously in the opposite directions. By fixing the synchronizing gear box 66 to the rack case 50 by the fixing mechanism 67 in this manner, even if surfaces with which the tires are brought into contact are inclined or are different in frictional state from each other, it is possible to simultaneously move the pair of rack bars 53 and 54 by the same distance in the right and left directions, respectively, relative to the synchronizing gear box 66, which is fixed in position. This in turn makes it possible to quickly move the right and left wheels w to the target steering angle, and the wheels can be steered in a stable manner.

The first and second rack bars 53 and 54 of each of the steering devices 10 and 20 are moved simultaneously in the opposite directions to each other by the same distance until, as shown in FIG. 5, the center axes of all four wheels w substantially extend to the center of the vehicle, and the coupling mechanisms 63 of the respective steering devices 10 and 20 are coupled in this state. Since the center axes of all four wheels w substantially extend to the center of the vehicle, the vehicle can turn on the same spot with the center of the vehicle remaining unchanged (or substantially unchanged) under the driving forces from the in-wheel motors M mounted in the respective wheels w. Since the synchronizing gear box 66 remains fixed to the rack case 50 in this state, the vehicle can turn on the spot in a stable manner.

In this mode, the vehicle can be turned on the same spot not by all of the in-wheel motors M mounted in the respective wheels w but by at least one of them.

(Lateral Travel Mode)

Figure 6:
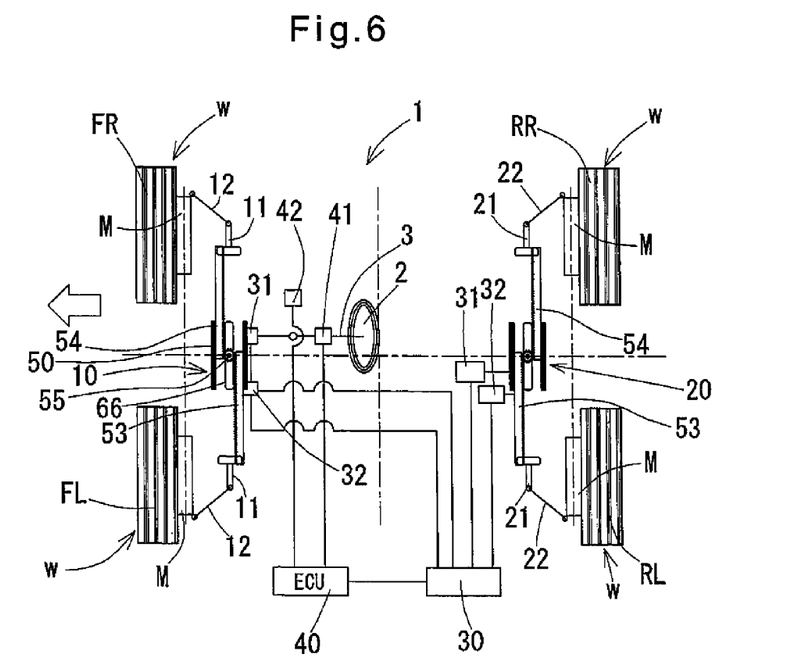
FIG. 6 is a plan view of the vehicle of FIG. 2(a) during a lateral travel (parallel travel) mode.

A lateral travel mode is shown in FIG. 6. In this mode, as in the pivot turn mode, for each of the steering devices 10 and 20, by fixing the synchronizing gear box 66 to the rack case 50 at the position where it is fixed while the vehicle is traveling in a straight line, by the fixing mechanism 67, and uncoupling the coupling mechanism 63 (see FIGS. 9(*a*) and 9(*b*)), the first and second rack bars 53 and 54 become movable separately from each other. Thus, when the driving force of the mode switching actuator 32 is applied to the first pinion gear 62, the first rack bar 53 and the second rack bar 54 are simultaneously moved by the same distance in the opposite directions to each other by the action of the first synchronizing gears 55 disposed between the first rack bar 53 and the second rack bar 54, so that the right and left wheels w are steered simultaneously in the opposite directions. By fixing the synchronizing gear box 66 to the rack case 50 by the fixing mechanism 67 in this manner, even if surfaces with which the tires are brought into contact are inclined or are different in frictional state from each other, it is possible to simultaneously move the pair of rack bars 53 and 54 by the same distance in the right and left directions, respectively. This in turn makes it possible to quickly move the right and left wheels w to the target steering angle, and the wheels can be steered in a stable manner.

The first rack bar 53 and the second rack bar 54 of each steering device 10, 20 are simultaneously moved in the opposite directions to each other by the same distance such that all of the front and rear wheels w are oriented in the direction perpendicular to the direction in which the vehicle travels in a straight line (right and left direction with respect to the direction in which the vehicle travels in a straight line), by applying a rotational force from the mode switching actuator 32 to the first pinion gear 62. With the wheels w oriented in the direction perpendicular to the direction in which the vehicle travels in a straight line, the coupling mechanism 63 (see FIGS. 9(*a*) and 9(*b*)) is coupled to fix the rack bars 53 and 54 in position.

In this state, unlike the pivot turn mode, with the synchronizing gear box 66 of each steering device 10, 20 disconnected from the rack case 50, the first and second rack bars 53 and 54 in the rack case 50 are simultaneously moved in one of the right and left directions with respect to the direction in which the vehicle travels in a straight line, under the driving force of the normal steering actuator 31 or by operating the steering 2, to finely adjust the directions (angles) of the wheels w.

FIG. 6 shows the positional relationship between the steering devices 10 and 20 for the front and rear wheels w, respectively, and the directions of the wheels w, during the lateral travel mode. Compared to the pivot turn mode, the rack bars 53 and 54 protrude laterally outwardly to a larger degree. Thus, in this mode, the connecting points between the tie rods 12 and 22 and the respective wheels w are located at the outermost positions in the width direction of the vehicle. During the lateral travel mode too, it is possible to finely adjust the directions (angles) of the wheels w under the driving force of the normal steering actuator 31 or by operating the steering 2.

(Further Travel Mode)

In a further travel mode, when an electronic control unit (ECU) 40 determines that the vehicle 1 is traveling at a high speed, based on an output of the ECU 40, an actuator driver 30 drives the mode switching actuator 32 for the rear wheels such that the rear left and rear right wheels RL and RR are turned from the parallel position so as to be slightly closed at their front ends (toe-in state). This allows stable high-speed travel.

Such toe adjustment may be made based on travel states of the vehicle, such as the vehicle speed and loads on the axles, as determined by the ECU 40, or based on the input from the mode switching means 42, which is provided in the driver/passenger cabin. A driver can switch the travel mode by operating the mode switching arrangement 42. The mode switching means 42 may be a switch, a lever or a joystick operable by a driver.

(Mode Switching)

The mode switching arrangement 42 is also used to switch one of the above travel modes to another. That is, by operating the mode switching arrangement 42, it is possible to select any of the normal travel mode, pivot turn mode, lateral travel mode, small-radius turning mode, etc. The mode switching arrangement 42 may be a switch, a lever, a joystick, etc. Since any travel mode is selectable by operating e.g. a switch, the mode switching can be made safely.

During the normal travel mode, the ECU 40 calculates the necessary moving amount of the rack bars 53 and 54 of the steering device 10 in one of the right and left directions, based on information from a sensor 41 when the steering 2 is operated, and based on the results of calculation, the ECU 40 controls the normal steering actuator 31 for the front wheels, to move, together with each other, the rack bars 53 and 54 received in the rack case 50 in the one of the right and left directions, thereby steering the front right and front left wheels w by necessary angles in a necessary direction.

When the pivot turn mode is selected by operating the mode switching arrangement 42, it is possible to steer the four wheels w through the steering devices 10 and 20 for the front and rear wheels, respectively, such that the vehicle 1 turns substantially about the center of the vehicle. This mode is permitted only while the vehicle 1 is at a stop. During the pivot turn mode, the ECU 40 calculates the relative movements of the rack bars 53 and 54 of the respective steering devices 10 and 20, and based on the results of calculation, the ECU 40 controls, through the actuator driver 30, the mode switching actuators 32 for the front and rear wheels, thereby steering the wheels.

When the lateral travel mode is selected by operating the mode switching arrangement 42, it is possible to steer the four wheels w through the steering devices 10 and 20 for the front and rear wheels, respectively, such that the four wheels w form a steering angle of 90 degrees. At this time, too, the ECU 40 calculates the relative movements of the rack bars 53 and 54 of the respective steering devices 10 and 20, and based on the results of calculation, the ECU 40 controls, through the actuator driver 30, the mode switching actuators 32 for the front and rear wheels, thereby steering the wheels. The normal steering actuators 31 may be configured, during the lateral travel mode, to be deactivated, or kept activated so that the steering angles can be finely adjusted by the normal steering actuators 31.

When the small-radius turning mode is selected by operating the mode switching arrangement 42, the front wheels and the rear wheels are steered in opposite directions to each other so that the vehicle can turn with a smaller radius. During the small-radius turning mode, the ECU 40 calculates moving amounts of the rack bars 53 and 54 of the steering device 20 for the rear wheels, which are received in the rack case 50, based on e.g. the operation of the steering wheel 2, and based on the results of calculation, the ECU 40 controls, through the actuator driver 30, the normal steering actuator 31 and the mode switching actuator 32 for the steering device 20 to steer the rear wheels. The steering device 10 for the front wheels is controlled in the same manner as during the normal travel mode.

As described above, based on the steering angle of the steering wheel 2, the information from the sensor 41, which detects e.g. the steering torque, and/or the input from the mode switching arrangement 42, or based on the travel condition of the vehicle determined by the ECU 40 itself, the ECU 40 calculates necessary moving amounts of the rack bars 53 and 54 of the respective steering devices 10 and 20, and based on the results of calculation, the ECU 40 controls, through the actuator driver 30, the normal steering actuators 31 or the mode switching actuators 32, of the respective steering devices 10 and 20, thereby steering the front and rear wheels.

In the embodiment, the steering device 20 for the rear wheels is controlled by the steer-by-wire configuration, in which the steering operation as well as the operation of the mode switching actuator 32, which are carried out by a driver, are converted to electric signals to steer the wheels.

For the steering device 10 for the front wheels too, the steer-by-wire configuration using the normal steering actuator 31 and the mode switching actuator 32 may be used. In another arrangement, the normal steering actuator 31 for the steering device 10 comprises a motor coupled to a steering wheel 2, which is operated by a driver, or to the steering shaft 3, and configured to assist the manual steering operation by generating torque necessary to move the rack bars 53 and 54 in the right and left directions. In this arrangement, the mode switching actuator 32 for the front wheels is of the same structure as the actuator 32 for the rear wheels.

The steering device 10 for the front wheels, which is used for steering during the normal travel mode, may be an ordinary steering device using an ordinary mechanical rack and pinion mechanism.

The above-described travel modes are mere examples, and other control modes using the above-described mechanism are feasible.

The vehicle according to the present invention comprises a steering force generating means capable of generating a steering force, and at least one steering device 10, 20 for steering right and left wheels of the vehicle, wherein the steering device comprises tie rods 12 and 22 connected, respectively, to the right and left wheels w, and configured to steer the respective right and left wheels, a pair of rack bars 53 and 54 connected to the respective tie rods 12 and 22, and a rack bar moving arrangement 60 capable of moving, by the same distance, the pair of rack bars 53 and 54 in one of opposite directions or in one and the other of the opposite directions, respectively, wherein the steering force generating means and the steering device are configured such that the pair of rack bars 53 and 54 are moved simultaneously with each other under the steering force generated by the steering force generating means. With this arrangement, since the right and left wheels w are always steered simultaneously with each other, it is possible to prevent only one of the four wheels from being steered due to malfunction, which in turn prevents loss of travel stability of the vehicle 1.

DESCRIPTION OF THE NUMERALS

2. Steering
10, 20. Steering device
12, 22. Tie rod
31. Normal steering actuator
53, 54. Rack bar
55. (First) synchronizing gear
60. Rack bar moving means
62. First pinion gear
63. Coupling mechanism
65. Second pinion gear
w. Wheel

What is claimed is:

1. A vehicle comprising:
a steering force generating arrangement capable of generating a steering force; and
at least one steering device for steering right and left wheels, the right and left wheels comprising a pair of front wheels of the vehicle or a pair of rear wheels of the vehicle,
wherein the steering device comprises:
tie rods connected to the right and left wheels, respectively, and configured to steer the respective right and left wheels;
a pair of rack bars each connected to a respective one of the tie rods; and
a rack bar moving arrangement configured to selectively move the pair of rack bars a same distance in (i) opposite lateral directions simultaneously relative to a longitudinal axis of the vehicle; and (ii) a same one of the opposite lateral directions simultaneously relative to the longitudinal axis of the vehicle;
wherein the steering force generating arrangement and the steering device are configured such that the pair of rack bars are moved simultaneously with each other under the steering force generated by the steering force generating arrangement.

2. The vehicle of claim 1, further comprising a steering actuator, wherein the steering force generated by the steering force generating arrangement is one of a torque generated when a steering wheel of the vehicle is turned by a driver of the vehicle, and a torque generated by the steering actuator, the steering actuator being configured to be actuated when the steering wheel is turned by the driver.

3. The vehicle of claim 2, wherein the rack bar moving arrangement comprises:
a synchronizing gear meshing with the pair of rack bars, the synchronizing gear being configured to convert a movement of a first one of the rack bars in a first one of the opposite lateral directions along a direction in which teeth of the rack bars are arranged; to a movement of a second one of the rack bars in a second one of the opposite directions;
a first pinion gear meshing with said first one of the rack bars;
a second pinion gear meshing with said second one of the rack bars; and
a coupling mechanism configured to selectively couple together the first pinion gear and the second pinion gear, and to selectively uncouple the first pinion gear the second pinion gear from each other.

4. The vehicle of claim 3, wherein the at least one steering device comprises two of the steering devices, each of the two steering devices being provided for steering a respective one of the pair of front wheels and the pair of rear wheels.

5. The vehicle of claim 2, wherein the at least one steering device comprises two of the steering devices, each of the two steering devices being provided for steering a respective one of the pair of front wheels and the pair of rear wheels.

6. The vehicle of claim 1, wherein the rack bar moving arrangement comprises:
a synchronizing gear meshing with the pair of rack bars, the synchronizing gear being configured to convert a movement of a first one of the rack bars in a first one of the opposite lateral directions along a direction in which teeth of the rack bars are arranged to a movement of a second one of the rack bars in a second one of the opposite directions;
a first pinion gear meshing with said first one of the rack bars;
a second pinion gear meshing with said second one of the rack bars; and
a coupling mechanism configured to selectively couple together the first pinion gear the second pinion gear, and to selectively uncouple the first pinion gear the second pinion gear from each other.

7. The vehicle of claim 6, wherein the at least one steering device comprises two of the steering devices, each of the two steering devices being provided for steering a respective one of the pair of front wheels and the pair of rear wheels.

8. The vehicle of claim 1, wherein the at least one steering device comprises two of the steering devices, each of the two steering devices being provided for steering a respective one of the pair of front wheels and the pair of rear wheels.

* * * * *